US006481710B2

(12) United States Patent
Enders et al.

(10) Patent No.: US 6,481,710 B2
(45) Date of Patent: Nov. 19, 2002

(54) APPARATUS FOR TRANSPORTING INDIVIDUAL SHEETS THROUGH A DEVICE FOR EXPOSING OR PRINTING THE SHEETS

(75) Inventors: Wolf-Dieter Enders, Grossenstein; Jürgen Heyne, Wormstedt; Dietmar Schulz, Ortsteil Nerkewitz; Joachim Schwuchow, Thalbürgel, all of (DE)

(73) Assignee: Agfa-Gevaert AG, Leverkusen (DE)

(*) Notice: Subject to any disclaimer, the term of this patent is extended or adjusted under 35 U.S.C. 154(b) by 53 days.

(21) Appl. No.: 09/776,228

(22) Filed: Feb. 2, 2001

(65) Prior Publication Data

US 2001/0010415 A1 Aug. 2, 2001

(30) Foreign Application Priority Data

Feb. 2, 2000 (DE) ........................................ 100 04 533

(51) Int. Cl.[7] .................................................. B65H 5/02
(52) U.S. Cl. ........................ 271/275; 271/312; 271/314
(58) Field of Search .............................. 271/3.14, 3.21, 271/275, 312, 313, 314; 346/107.6, 125, 132, 138; 355/72, 104, 128; 347/262, 264

(56) References Cited

U.S. PATENT DOCUMENTS

| | | | |
|---|---|---|---|
| 2,695,785 A | * 11/1954 | Dashiell et al. | |
| 2,895,395 A | * 7/1959 | Gern | |
| 3,639,060 A | * 2/1972 | Jaskowsky | 355/104 |
| 3,667,752 A | * 6/1972 | Samczyk | |
| 4,659,073 A | * 4/1987 | Leonard | 271/275 X |
| 5,443,254 A | * 8/1995 | Reist | 271/225 |
| 5,493,363 A | 2/1996 | Morita | 355/99 |
| 5,975,772 A | 11/1999 | Imai et al. | 396/575 |

FOREIGN PATENT DOCUMENTS

| | | | |
|---|---|---|---|
| DE | 3000887 A1 * | 8/1980 | |
| DE | 19636235 A1 * | 3/1998 | |
| JP | 06222542 | 8/1994 | G03D/13/00 |
| JP | 09211833 | 8/1997 | G03D/13/00 |

* cited by examiner

*Primary Examiner*—David H. Bollinger
(74) *Attorney, Agent, or Firm*—Darby & Darby

(57) ABSTRACT

An apparatus for transporting individual sheets past an exposure station for exposing the individual sheets, including a roller that has parallel spaced annular grooves and has plurality of parallel endless belts on each side of the exposure station, which belts respectively overlie the grooves for pressing the individual sheets against the roller. Guiding fingers extend into the roller parallel annular grooves for lifting the individual sheets from the roller.

13 Claims, 4 Drawing Sheets

1
2
3
4
5
7
8
9
10
10
11
13
14

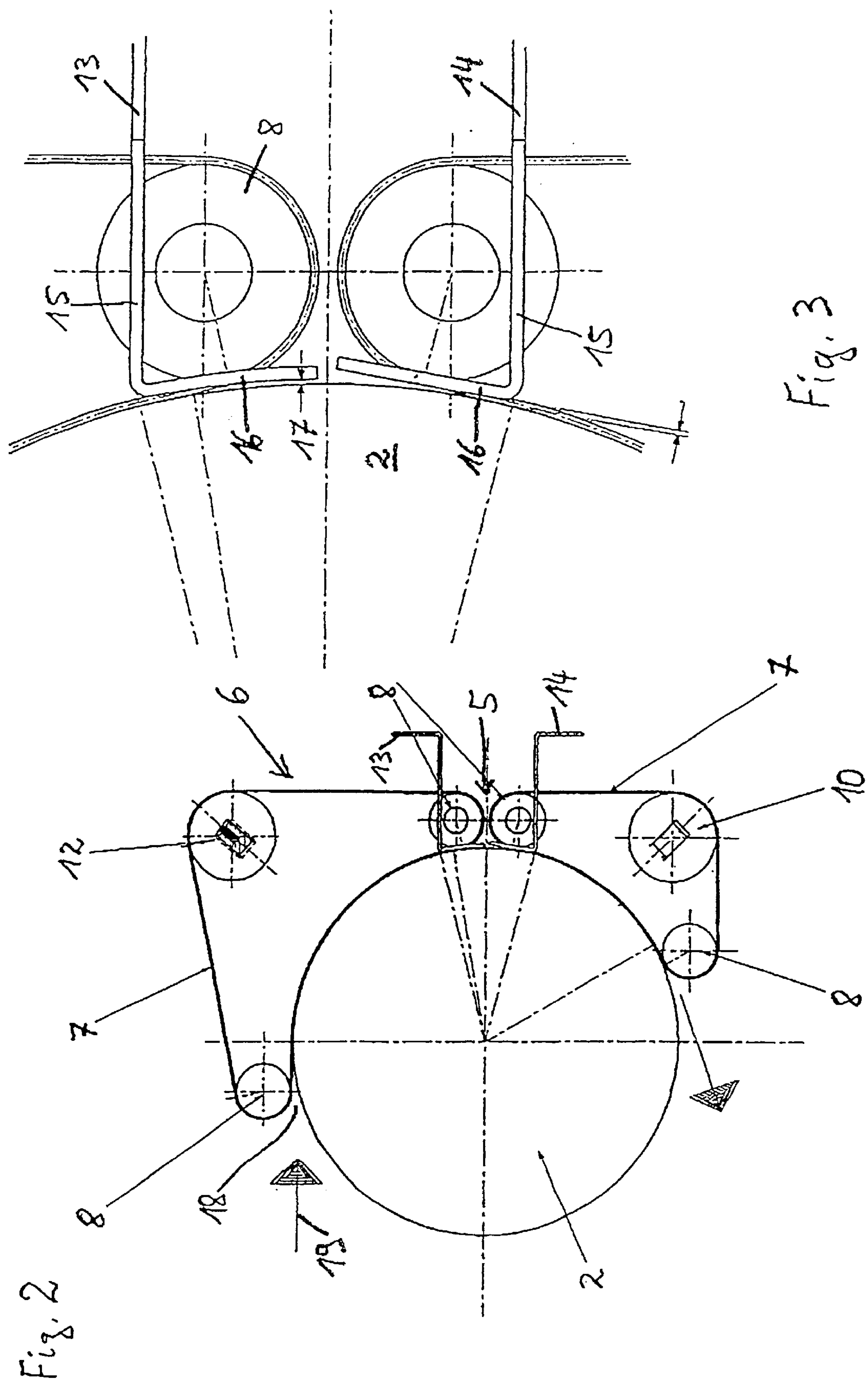

APPARATUS FOR TRANSPORTING INDIVIDUAL SHEETS THROUGH A DEVICE FOR EXPOSING OR PRINTING THE SHEETS

FIELD OF THE INVENTION

The invention is for an apparatus for transporting individual sheets past a device for exposing of or printing on the individual sheets.

BACKGROUND OF THE INVENTION

In patent DE 196 36 235 A1, an apparatus for recording information on photographic material, which can be developed thermally, is described. In this apparatus, a heated roller is provided around which a sheet is deflected and which roller rotates each individual sheet by about 180°. In the first part of the deflection, the individual sheet is fixed to the roller by means of four pressure rollers. Between these pressure rollers there is an exposure gap through which a laser beam writes on the individual sheet to expose it. After the exposure, the pressure function is taken over by an endless belt, which is looped around the roller in this second region of the deflection. The endless belt has the task of holding the sheet in close contact with the roller so that the best possible transfer of heat can take place between the roller and the sheet.

Patent DE 30 00 887 A1 discloses an ink jet printer in which individual sheets are detached from a roller by guiding fingers engaging parallel annular grooves.

OBJECT OF THE INVENTION

It is an object of the invention to provide an apparatus using a roller for transporting individual sheets past an exposure gap. The apparatus includes corresponding means for guiding the individual sheets around the roller in such a manner that a continuous, jerk-free movement of the individual sheets is assured even in the case of different formats such as sheet thickness and especially of different widths of the sheets and jamming or tilting of the sheets is prevented.

In a preferred embodiment, a plurality of endless parallel belts guide each individual sheet, irrespective of its size, without slippage in close contact with the roller. The roller has annular grooves into which guiding fingers extend to engage below the front edge of the individual sheet so that the sheet is lifted from the surface of the roller without a jerking motion and can be supplied to a subsequent transporting unit.

In the apparatus, the space in which an exposure unit is located is heated during a prolonged operation to a temperature, typically of about 35° C. The individual sheets, which are of a light-sensitive material, are usually cut off from rolls in light-tight cassettes or the sheets are housed in light-tight cassettes when they are not being exposed. The cassettes and the light-sensitive materials in them are at normal room temperature, typically of about 20° C.

Due to the contact with the roller, which can become heated by heat from the exposure device or other sources, the paper heats up. It was found that individual sheets are heated up far less rapidly at places at which they do not come into contact with the roller. In the present invention, this is accomplished by providing annular grooves in the roller at places over which the sheets run and, as a result, also are sensitized less. This would normally express itself by dark stripes in the finished image.

The effect of the dark stripes is avoided in the present invention by positioning the annular grooves opposite endless belts which also become heated. In this way, each place of the paper is in contact at least with an endless belt or with the surface of the roller so that the individual sheets are heated at least from one side. As a result, temperature differences over the area of the light-sensitive layer of the sheet are minimized and the stripes in the image are avoided.

The endless belts are constructed as flat belts so that the pressure on the sheet is distributed over a relatively large area. The flat belts are somewhat broader than the annular grooves so that the light-sensitive sheet lies smoothly on the surface of the roller and cannot be pressed into the annular grooves. It has turned out that the heating of the paper from the upper side by the belts and the underside by the roller has far less of an effect then the absence of heating from one side. The overlapping between the roller grooves and the endless belts does not have a harmful effect at the lateral edges of the annular grooves and is not visible in the finished image.

In order to be able to ensure good contact between the roller and the individual sheet, several endless belts are provided before as well as after the exposure station and loop the roller in each case at an angle larger than 40 degrees of the 360 degree surface of the roller.

It has also turned out to be advantageous to dimension the diameter of the roller so that it is not less than 150 mm. At a smaller diameter, the internal stresses, for example, of the photographic paper would exert a force on the belts so that a reliable contact between the paper and the roller could no longer be assured.

Ideally, the flat belts have a width of between 8 and 12 mm, whereas the annular grooves have a width of 3 to 5 mm. An overlapping between the roller surface on the one side and the endless belts on the other of 2 to 4 mm should be maintained on either side of the annular grooves. In this way, it is ensured that the flat belt is guided to overlie on the edges of the annular groove without running the risk that the paper will be pressed into an annular groove. On the other hand, the overlapping is so slight that there is no danger of a local temperature peak due to heating from both sides.

BRIEF DESCRIPTION OF THE DRAWINGS

Further details and advantages of the invention are described in conjunction with the description of an example, which is illustrated in detail by means of the drawings, in which:

FIG. 2 is a cross-section through the apparatus of FIG. 1;

FIG. 3 shows an enlarged detail of FIG. 2;

DETAILED DESCRIPTION OF THE INVENTION

Figure 1:
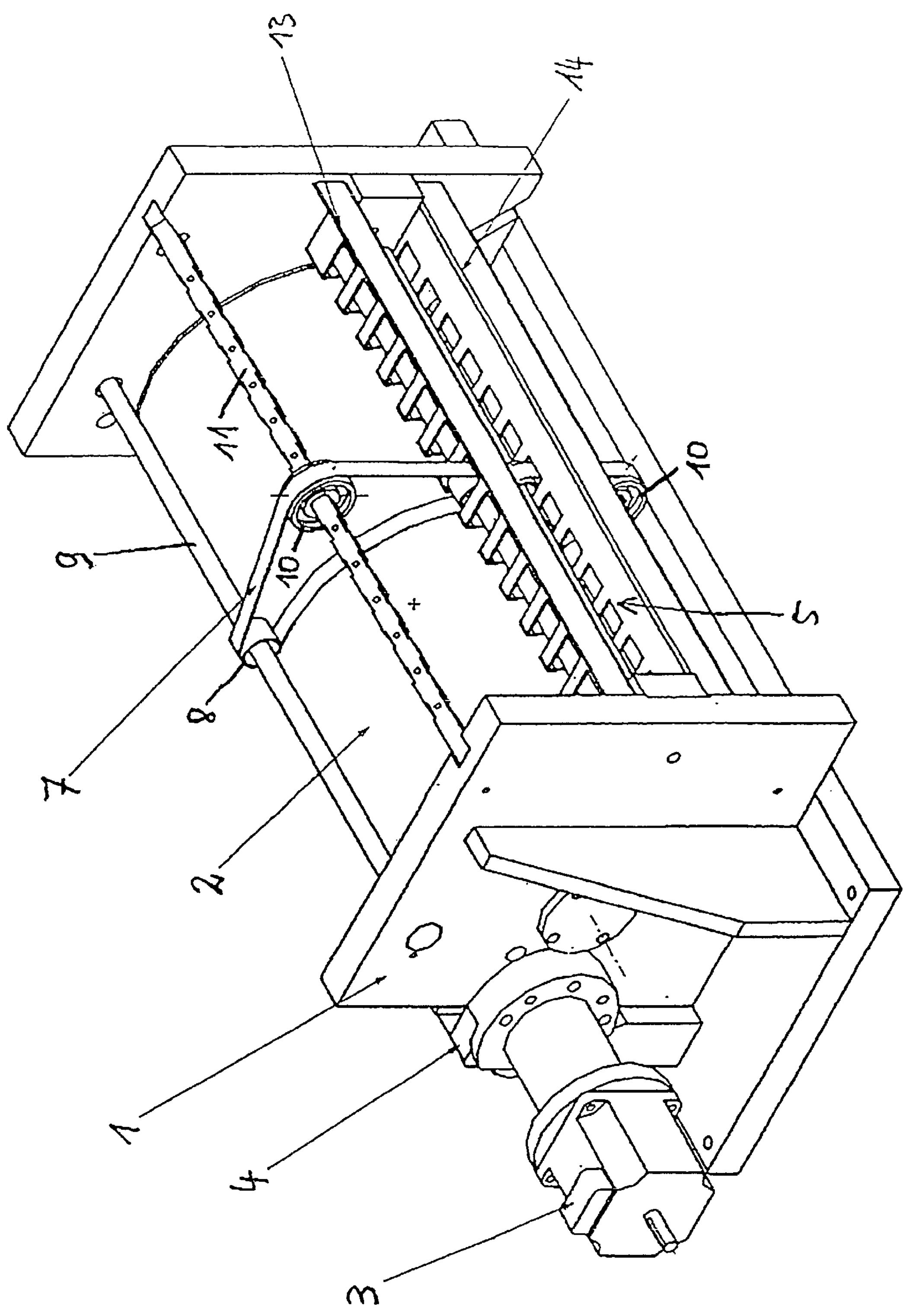
FIG. 1 is a perspective view of a laser exposure unit for photographic paper in accordance with the invention.

In the exposure device shown in FIG. 1, a print roller 2 is mounted in a frame 1. The invention is described with respect to a laser exposure device, but other types of such devices can be used. The print roller 2 is driven by a motor 3. Between the motor 3 and the print roller 2 there is a friction gear 4, which converts a fast rotation speed of the motor output into a slower and uniform speed of the print roller 2.

On each of the entry and exit sides of an exposure gap 5, a plurality of belt units 6 are provided. Each belt unit includes an endless belt. There are a plurality of the units 6 along the length of the roller 2 on each side of the exposure gap 5 to engage a sheet being fed across its width. The endless belts of the unit 6 act to hold the individual sheets in contact with the print roller 2.

For reasons of clarity, only one belt unit and belt component 7 is shown in FIG. 1. The details of the belt units 6 on the opposite sides of the exposure gap are shown in FIG. 2. Again, there are a plurality of the units 6 along the roller length.

Each unit 6 has an endless belt 7 stretched to lie around a part of roller 2 and extends around two fixed deflection rollers 8*a* and 8*b*. Each of the deflection rollers 8 is mounted on a support 9 extending across frame 1.

The deflection roller 8*a* of each belt unit 6 is disposed on one side of the exposure gap 5 in the transporting (feeding) direction of the individual sheets. As seen in FIGS. 2 and 3, the surface of the roller 8*b* of the upper unit forms with the print roller 2 a wedge-shaped intake gap 18, which can accept individual sheets, the front edge of which sheet can deviate slightly from a nominal position.

A tensioning roller 10 acts on the belt 7 of a unit 6 with a defined tension so that the belt always presses with the same force on the surface of the roller irrespective of whether there is a thick or a thin sheet, or even no paper on the print roller 2. Each tensioning roller 10 is mounted on a common support 11 shown extending across frame 3, and each acts upon its corresponding belt 7 in the tensioning direction against the support 11 by a spring 12 (see FIG. 2).

The individual belts 7 do not have a driving mechanism and are moved over the print roller 2 as the print roller is rotated.

The exposure gap 5 is bounded across its width by two comb-like guide plates 13, 14, which dip with their prongs 15 through the belts 7 across the roller length. Both guide plates 13, 14 are movable relative to roller 2 so that the position of free ends of the legs 16 can be alternately moved from generally parallel to the surface of the roller, as shown by the upper leg 16 of FIG. 3, to a position inclined from the roller, as shown by the lower leg 16 of FIG. 3. This is accomplished by a mechanism (not shown) that can be driven, for example, by a solenoid. The width of the gap 17 between the print roller 2 and each of the legs 16 when parallel to the roller corresponds to the thickest paper sheet that is to be processed.

Figure 4:
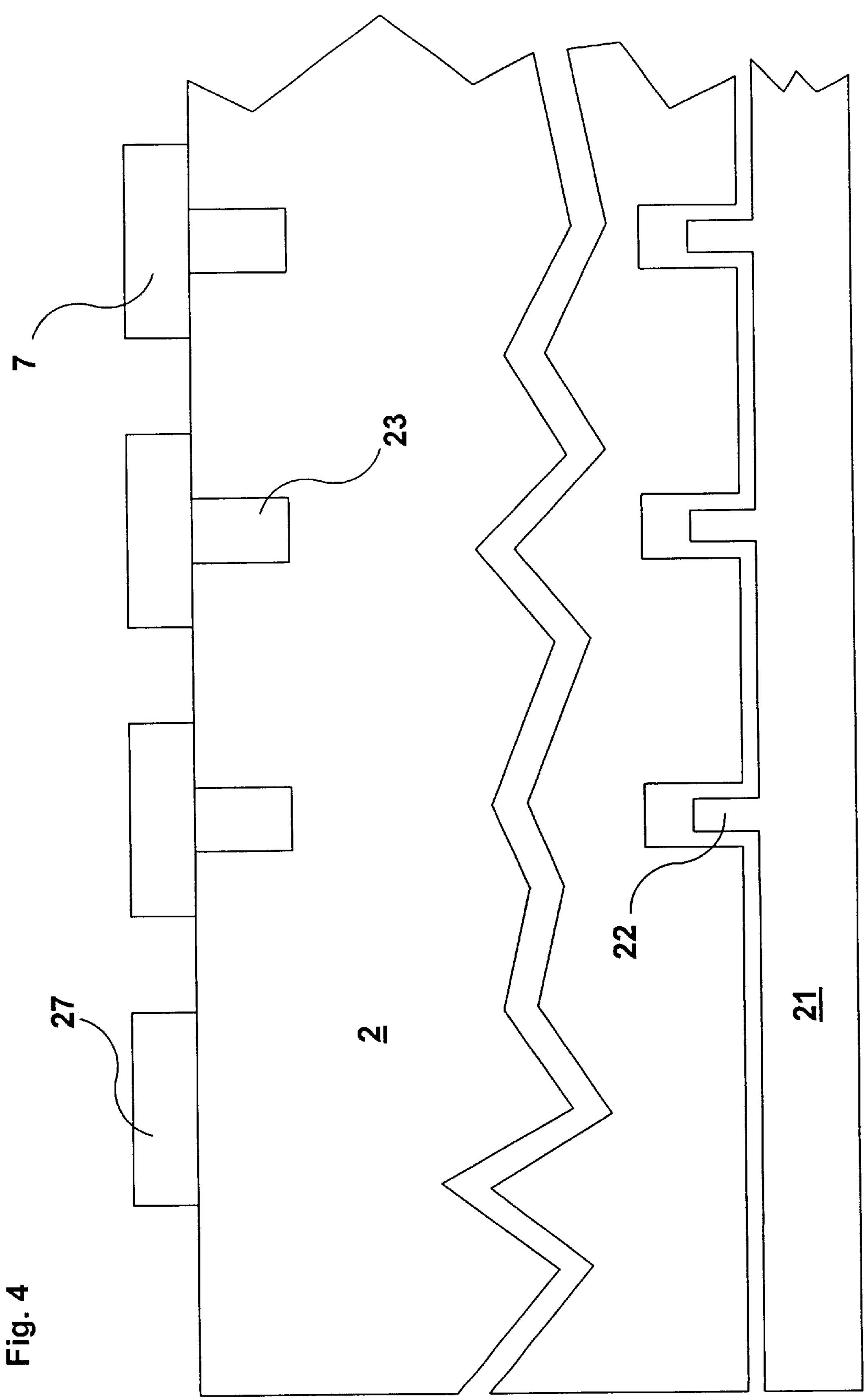
FIG. 4 is a view of a further detail of the apparatus shown in FIG. 1.

As seen in FIG. 4, the print roller 2 has a plurality of parallel annular grooves 23. At the ejection gap of the lower belt units 6, to which the arrow 20 in FIG. 2 points, the guiding element 21 shown in FIG. 4 is provided. The guiding element 21 has guiding fingers 22, which fit in the annular grooves 23 of roller 2. Preferably, the guiding fingers 22 are disposed so that there is no contact with the print roller 2. Consequently, there is no frictional effect, which could affect the rotation of the roller 2. The fingers 22 lift the sheet from the roller at the exit point 20 (FIG. 2). This adds in feeding the individual sheets to a transporting unit (this is not shown here and is independent of the roller 2).

Figure 5:
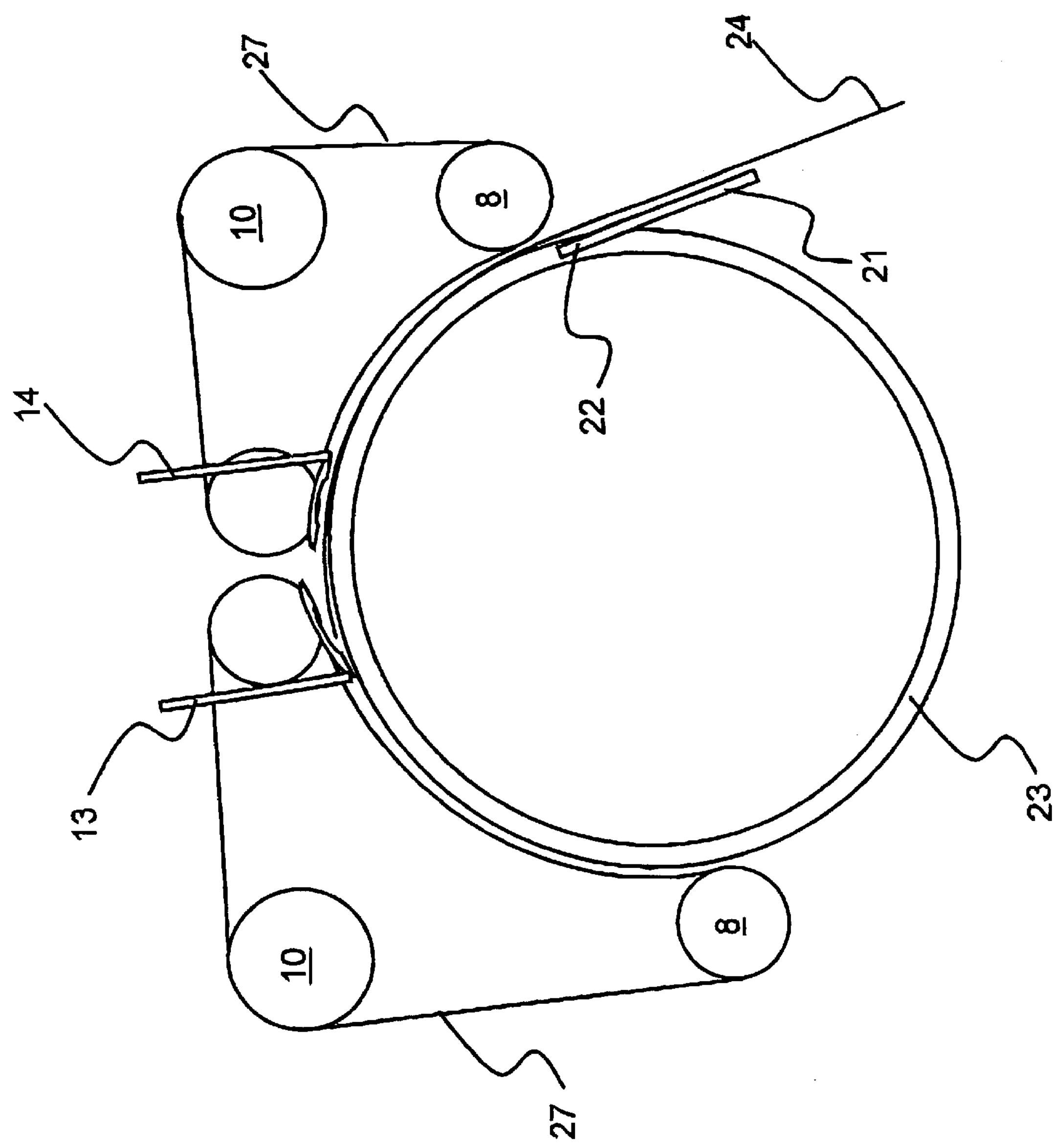
FIG. 5 is a view of a sheet leaving the mechanism.

As seen in FIG. 5, the guiding fingers 22 engage a sheet leaving the roller 2 at the exit 20 at an acute angle beneath the front edge of the individual sheets and lifts the sheet jerk-free from the surface of the roller 2. The number of guiding fingers 22 are preferably made equal relative to each side of the center of the roller 2.

When the apparatus is in operation, the roller 2 and the belts will be heated by the waste heat of the motor 3 and of the laser exposure device. Therefore, during normal operation the roller and the belts are at a higher temperature than the individual sheets coming from outside the housing.

FIG. 4 shows the endless belts of the drive units 6 distributed across the length of the roller. There is a flat belt, here designated 27, near each end of the roller that opposes a part of the surface of the roller 2 that does not have an annular groove 23. The individual sheets are heated in the regions of these flat belts 27 from the top by the belts and from the bottom by the roller. But this does not lead to greater sensitization of the light-sensitive layer, so that the image quality does not suffer.

Other flat belts 27*a* of the drive units 6 are arranged so that each covers a respective annular groove 23, completely. In order to ensure that these flat belts 27*a* can securely hold a sheet on the surface of the roller and to prevent the side edge of such flat belts 27*a* running into an annular groove 23, the width of these flat belts 27*a* is selected to be larger than the width of the annular grooves 23. Ideally, the width of a flat belt 27*a* is about 2½times the width of an annular groove 23.

For an individual sheet being supplied in the direction of the arrow 19, an intake gap 18 accommodates the thickness of the individual sheet. The gap is formed between the flat belts 27 of the (first) belt units 6 at the ends of the roller and the print roller 2 surface. The belts 27 at the ends of the roller continue to lie directly on the surface of the roller. Thus, transverse or rotational forces are prevented from acting on the individual sheet so that the latter is transported completely straight and uniformly.

Before the leading edge of the individual sheet being fed reaches the deflection rollers 8*a* of the upper (first) belt units 6 on the feed side of the apparatus, which rollers 8*a* are disposed directly in front of the exposure gap 5, the guide plate 13, which is also disposed in front of the exposure gap 5, is positioned so that the legs 16 are approximately parallel to the surface of the roller 2. On the other hand, the guide plate 14, which is on the output side of the exposure gap 5, is positioned so that the legs 16 form a wedge-shaped gap with the surface of the roller (see FIG. 3).

In this manner, the leading edge of the individual sheet is held by the legs 16 of the first guide plate 13 in close contact with the print roller 2 and is permitted to lift off slightly from the surface of the roller by the fingers 16 of the guide plate 14 only after learning the exposure gap. The leading edge is thereafter captured gently by the fingers 16 of the second guide plate 14 and beyond the wedge-shaped gap once again pressed onto the print roller 2. A practically jerk-free transport of the leading edge across the exposure gap 5 is made possible by the acute angle of the wedge-shaped gap between the fingers 16 of the plate 14 and the roller 2.

Before the rear, or trailing, edge of the individual sheet reaches the first guide plates 13, the latter is moved into a raised position, in which a wedge-shaped gap is formed. When now the rear edge reaches this guide plate 13, it can lift off slowly and jerk-free by a small amount from the print roller 2, following the relief of tension in the paper. However, since the second guide plate 14, which is disposed behind the exposure gap 5, is in the lowered position with its legs 16 parallel to roller 2, the rear edge of the individual sheet, as soon as the latter has passed by the exposure gap 5, once again lies almost on the print roller 2.

By means of the inventive arrangement, it becomes possible to expose individual sheets with good image quality and completely without a margin from their leading edge up to the rear edge.

At the outlet gap 20, the front edge of the individual sheet runs gently onto the guiding fingers 22 protruding into the annular grooves 23 and, in this manner, is lifted from the surface of the roller. The individual sheet is supplied over the guiding element 21 to the next transporting device.

By the arrangement of the heated flat belts 27*a* lying over the annular grooves 23, and the heated belts 27 lying over the roller surface at its ends, each individual sheet on its path between the inlet gap 18 and the outlet gap 20 is brought uniformly to the temperature of the roller 2 and of the endless belts 27 and 27*a*. By these means, it is reliably avoided that temperature differences become visible in the finished images in the form of stripes.

Of course, the invention is not limited only to laser exposing devices for photographic paper. Instead, it develops its advantages also in other devices in which individual sheets are to be inscripted. As an example, reference is made here only to another device, in which individual sheets are inscripted with the help of a line exposing devices, such as an LCD line, an LED line or a line DMD (digital micromirror device).

Specific features of the invention are shown in one or more of the drawings for convenience only, as each feature may be combined with other features in accordance with the invention. Alternative embodiments will be recognized by those skilled in the art and are intended to be included within the scope of the claims.

We claim:

1. Apparatus for transporting sheets comprising:

a rotating roller having a plurality of spaced, parallel annular grooves across a portion of its length; and a plurality of endless belts spaced apart facing the roller with a sheet fed between said plurality of belts and said roller, a said endless belt overlying a respective annular groove of said roller.

2. The apparatus of claim 1 wherein said plurality of endless belts comprise pairs of belts with an exposure gap between the belts of each pair.

3. The apparatus of claim 2 further comprising guiding fingers which extend into said grooves for lifting a sheet from the roller.

4. The apparatus of claim 2 further comprising guiding fingers which extend into said grooves positioned at a point where a sheet is to exit from the roller.

5. The apparatus of claim 1, wherein said endless belts are flat belts.

6. The apparatus of claim 5, wherein the flat belts are wider than the annular grooves.

7. The apparatus of claim 2, wherein each belt contacts the roller over a region of more than 40 degrees.

8. The apparatus of claim 1, wherein the roller has a diameter of at least 150 mm.

9. The apparatus of claim 5, wherein the flat belts have a width of between 8 and 12 mm.

10. The apparatus of claim 1, wherein the angular grooves have a width of between 3 and 5 mm.

11. The apparatus of claim 6, wherein the flat belts are 4 to 8 mm wider than the annular grooves.

12. The apparatus of claim 2, further comprising at least one belt positioned to overlie a part of the roller that does not include an annular groove.

13. The apparatus of claim 12 wherein a belt that does not overlie an annular groove is at each end of the roller.

* * * * *